Jan. 18, 1955   D. M. McCALLUM ET AL   2,699,677
VELOCITY MEASURING APPARATUS
Filed Jan. 16, 1950   7 Sheets-Sheet 6

Inventors
Donald Murdo McCallum
Hubert Gent
By Cushman, Darby & Cushman
Attorneys Jan. 18, 1955   D. M. McCALLUM ET AL   2,699,677
VELOCITY MEASURING APPARATUS
Filed Jan. 16, 1950   7 Sheets-Sheet 7

INVENTORS
*Donald M. McCallum*
*Hubert Gent*

BY *Cushman, Darby & Cushman*
ATTORNEYS

United States Patent Office 2,699,677
Patented Jan. 18, 1955

2,699,677

VELOCITY MEASURING APPARATUS

Donald Murdo McCallum, Hollinwood, and Hubert Gent, West Malvern, England, assignors to Ferranti Limited, Hollinwood, England, a British company Application January 16, 1950, Serial No. 138,926

Claims priority, application Great Britain January 18, 1949

8 Claims. (Cl. 73—194)

This invention relates to apparatus for the measurement at a moving body of the velocity of such body with respect to the medium which surrounds it and a particular, although by no means exclusive, application of the invention is to effecting air-speed measurement in aircraft.

In British patent specification No. 603,644, filed August 8, 1945, apparatus is described for measuring the velocity of a moving body with respect to its surrounding medium and which makes use of the fact that a pressure wave in a medium having movement relative to the source of such wave travels faster in the direction of motion of such medium than in a stationary medium and that, accordingly, the velocity of the moving body may be derived by ascertaining the velocity of the pressure wave in the stationary medium and then subtracting the value obtained from the measured velocity in the moving medium. Although good results are obtainable with such apparatus, difficulty is sometimes experienced in ensuring that the stationary medium has the same characteristics, for instance, of temperature and humidity, as the moving medium and also that the stationary medium is really stationary (relative to the measuring apparatus carried by the moving body).

One object of this invention is to provide an improved form of apparatus for the purpose described above in which the need to ascertain the velocity of the pressure wave in the stationary medium is dispensed with.

Another object of the invention is to provide arrangements suitable for the measurement of velocities which are above that of the pressure wave in the stationary medium as well as for lower velocity measurements.

A further object of the invention is to provide velocity measuring apparatus comprising a source of pressure waves secured to the body whose velocity of movement is to be measured, first and second pressure wave receivers also secured to said body in positions where they respectively receive first and second components of the pressure wave radiated by said source through the surrounding medium in which the body is moving said positions being such that said components have unequal mean velocities between said source and their respective receivers, means for deriving first and second quantities which are dependent respectively on said mean velocities of said first and second components and computing means for deriving from said first and second quantities a measure of the velocity of said body with respect to said surrounding medium.

Yet another object of the invention is to provide velocity measuring apparatus in which separate sources of pressure waves are employed for cooperation with said first and second receivers while a further object is to provide apparatus in which two separate sources of pressure waves cooperate with a common receiver.

The source or sources of pressure waves are conveniently of a type providing a series of separate wave pulses and may be constituted by a spark-discharge device while the receiver or each of said receivers may be an electro-acoustic transducer. The first and second quantities are conveniently represented by the lengths or time-durations of pulses of electrical energy in which case the means for deriving such quantities may include a square-wave generator controlled as to its pulse initiating and terminating instants respectively by the transmission of a pressure wave from the source and the arrival of such wave at the receiver. The computing means for deriving a measure of the velocity of the moving body may include one or more reciprocal computors for deriving third and fourth quantities respectively proportional to the reciprocals of said first and second quantities and an output computor for deriving the required velocity measurement from such third and fourth quantities.

The above and other objects and features of the invention will be better understood from the following description of a number of different embodiments, given in conjunction with the accompanying drawings in which:

Figure 13 is a block schematic diagram of an alternative form of reciprocal computor.

Figures 17 and 18 are block schematic diagrams illustrating certain further modifications while.

Figure 1:
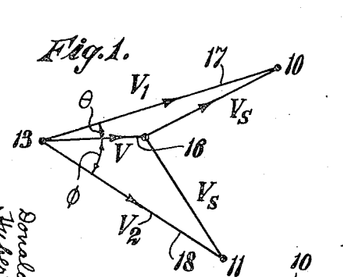
Figure 1 is a vector diagram illustrating the broad principles of the invention and, in particular the manner of operation of the practical embodiment shown in Figure 2.

The principles on which the invention is based will first be indicated with reference to the triangles of velocities shown in Figure 1 in which V represents the reversed velocity of the moving body, e. g. an aircraft, relative to the surrounding medium, e. g., air, along line 16 and $V_1$ is the apparent velocity, relative to the body, of the pressure wave along line 17 between a source 13 of such waves and a receiver 10, as measured by the apparatus; the directions of these velocities are inclined to each other at the angle $\theta$ by suitable disposition of such source and receiver on the moving body. The remaining side Vs of this triangle represents the velocity of the pressure wave relative to the surrounding medium when in still condition and at the same temperature and humidity as the stream passing the body. On solving this triangle in trigonometrical fashion one obtains the expression:

$$V_S^2 = V^2 + V_1^2 - 2VV_1 \cos \theta \qquad (1)$$

From the corresponding triangle of velocities associated with the straight line 18 to another receiver 11 one gets the similar expressions:

$$V_S^2 = V^2 + V_2^2 - 2VV_2 \cos \phi \qquad (2)$$

Where Vs and V have the same values as before, $\phi$ is the value of the angle between lines 16 and 18, and $V_2$ is the apparent velocity, relative to the moving body of the pressure wave along the line 18 between the source 13 and the second receiver 11, as measured by the apparatus.

By combining these two equations the term Vs can be made to disappear, thus obviating the need for ascertaining the velocity of the pressure wave in the surrounding medium when stationary in accordance with the first-mentioned object of the invention. As the result of this combination, i. e. of subtracting Equation 2 from Equation 1, one obtains the expression:

$$\frac{1}{V} = \frac{\cos\theta - \cos\phi}{V_1 - V_2} + \frac{\cos\theta + \cos\phi}{V_1 + V_2} \quad (3)$$

As $\theta$ and $\phi$ are constants, it will been seen that, as stated previously, the velocity $V$ of the moving body, such as an aircraft, may be calculated from the apparent velocities $V_1$ and $V_2$ of the pressure waves from the source of such waves to the cooperating receivers, relative to the aircraft moving body upon which the measurements are made.

Figure 2:
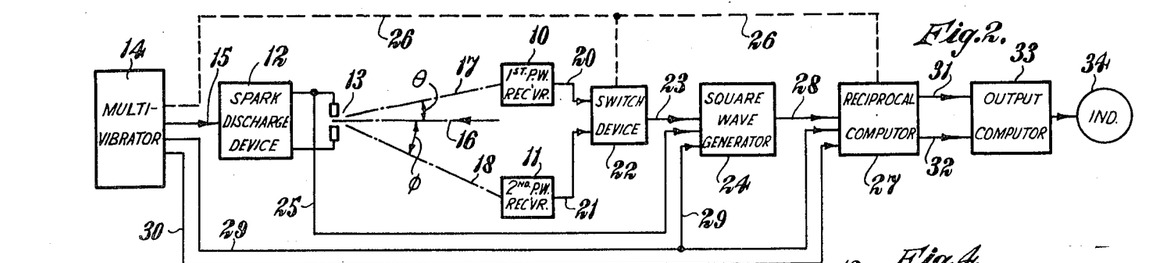
Figure 2 is a block schematic diagram of one practical embodiment of the invention.

Referring now to Figure 2 which shows in block schematic form and by way of example, one practical embodiment of the invention for measuring the velocity of an aircraft with respect to the surrounding air, the device comprises first and second receivers 10, 11 of pressure waves in the form of electroacoustic transducers each cooperating with a common source 13 for the radiation of said pressure waves and taking the form of a spark-gap across which sparks are capable of being produced by an electric spark-discharge device 12 when the latter is triggered by a multivibrator circuit 14 operating over lead 15. Receivers 10 and 11 are disposed at fixed equal distances of separation from the spark-gap 13 in part of the air stream surrounding the aircraft, and they are positioned behind the spark-gap with respect to the direction of movement of the aircraft. The angles between the straight line 16 indicating the direction of movement of the aircraft and the straight line paths 17 and 18 joining the receivers 10 and 11 to spark-gap 13 are denoted by $\theta$ and $\phi$ respectively. Suitable values for $\theta$ and $\phi$ are discussed later; the essential requirement is that they should be unequal.

Receivers 10 and 11 are connected by leads 20 and 21 to a selection switching device 22, which is controlled by multivibrator unit 14 over a switching link indicated by chain-dotted line 26, and thence by way of lead 23 to means for deriving a first and a second quantity which are proportional respectively to the times of transit to the first and second receivers 10, 11 of pressure waves radiated by the spark-gap 13. These quantities take the form of control pulses of electrical energy of appropriate length or time-duration so that the means for deriving these quantities comprises a square-wave generator 24 which is adapted to initiate a control pulse waveform synchronously with (or if desired at a chosen delay time after) the instant of transmission of a pressure wave from the spark-gap 13 and to terminate that pulse synchronously with (or at the same delay time after) the arrival of that pressure wave at the receiver 10 or 11. The initiation of such pulse waveform is effected by means of connection 25 between the spark-gap 13 and the square-wave generator 24 while the subsequent termination is effected by means of the connections set-up between the appropriate receiver 10, 11 and the square-wave generator 24 by way of the switching device 22. In practice, the time delay between the transmission of a pressure wave and the initiation of the corresponding pulse waveform is negligibly small. The operation of the square-wave generator 24 is also controlled to some extent by the multivibrator unit 14 over lead 29 as will be described in detail later.

As already explained with reference to Figure 1 the velocity of the aircraft may be calculated most readily from the apparent velocities (relative to the aircraft) of the pressure waves along the two paths 17, 18 from the spark-gap 13 to the receivers 10, 11 and these are inversely proportional to the first and second quantities mentioned above, i. e. the corresponding transit times represented by the lengths of the respective pulses derived in the square-wave generator 24. As a step in deriving a measure of the aircraft's velocity in this way it is therefore necessary to derive third and fourth quantities respectively proportional to the reciprocals of the lengths of the aforesaid pulses. These third and fourth quantities are derived by applying the out-put of square-wave generator 24 to a reciprocal computor 27 by way of lead 28. The operation of the reciprocal computor is controlled by multivibrator unit 14 over leads 29 and 30 and also by the switching link 26. The outputs from the reciprocal computor i. e. the derived third and fourth quantities which may be in the form of currents, voltages, or shaft rotations, are then applied by way of connections 31 and 32 respectively to an output computor 33 in which a measure of the aircraft's velocity is derived and displayed on an indicator 34. This indicator may be an integral part of the computor 33. Other methods, in which the further step of deriving said third and fourth quantities is not necessary, may be used to calculate the aircraft velocity—e. g. directly from the measured pressure-wave transit times—but these methods may also involve greater complexity in the final computor stages of the system being described.

The operation of the equipment outlined above is as follows. The multivibrator unit 14 operates in conventional manner and causes the periodic discharge of a spark across spark-gap 13 and hence the periodic transmission of a pressure-wave from the spark-gap to each of the receivers 10, 11. Although this pressure-wave is, of course, received by both receivers only one of them is connected to the rest of the equipment at any one time, this connection being made by the switching device 22 controlled by multivibrator unit 14 by way of switching link 26 as described above. Part of the energy causing each spark-discharge is fed to square-wave generator 24 over connection 25 to initiate a pulse, which is terminated by the arrival at square-wave generator 24 over lead 23 of energy derived from whichever of the receivers 10, 11 is switched through to the generator by switching device 22, this energy being consequent upon the arrival at that receiver of the pressure-wave radiated by that discharge of the spark. The switching device 22 is so controlled by multivibrator unit 14 that square-wave generator 24 is connected to receiver 10 during a period covering the transmission of a pressure-wave from spark-gap 13 and the subsequent reception of that wave at receiver 10, whereby a pulse of length proportional to the transit time of that pressure-wave to receiver 10 may be generated and is then connected to receiver 11 for a period covering the transmission of the next pressure-wave from spark-gap 13 and the reception of that wave at receiver 11 whereby a pulse of length proportional to the transit time of that pressure-wave to receiver 11 may be generated; the process is then repeated, with the result that the pulses generated by generator 24 form two series of pulses intercalated to produce alternate pulses associated respectively with the first and second quantities, that is to say, having lengths or time durations proportional to the times of transit of pressure-waves from the spark-gap 13 to the respective receivers 10, 11.

The reciprocal computor thus receives over connection 28 a train of pulses alternately representing the first and second quantities and it so operates, as will be described in full later, as to supply to output computor 33 over connections 31 and 32 outputs which are steadily proportional to the third and fourth quantities respectively, that is, proportional to the reciprocals of the transit times of the pressure-waves from spark-gap 13 to receivers 10 and 11 respectively as represented by the lengths of the pulses generated in square-wave generator 24. Output computor 33 functions so as to derive the velocity of the aircraft from the third and fourth quantities and for subsequent display on indicator 34.

The inputs to reciprocal computor 27 are first and second quantities $t_1$ and $t_2$ each of which, as described, represents the transit time of the pressure-wave to the appropriate receiver and the length of the corresponding pulse generated in square-wave generator 24. If $d_1$ and $d_2$ represent the distances between the spark-gap 13 and the respective receivers 10, 11, one obtains the expressions:

$$V_1 t_1 = d_1 \quad (4)$$

and $$V_2 t_2 = d_2 \quad (5)$$

The outputs from the reciprocal computer 27 over leads 31 and 32 are proportional respectively to the reciprocal of $t_1$ i. e. to $1/t_1$ or $V_1/d_1$ (from Equation 4), and to the reciprocal of $t_2$, i. e. to $1/t_2$ or $V_2/d_2$ (from Equation 5). The outputs from the reciprocal computor 27 are thus directly proportional to $V_1$ and $V_2$, the constants of proportionality, in other words the "scales" of $V_1$ and $V_2$, being equal when $d_1 = d_2$ as in the case of the embodiment being described.

The output computor 33 is therefore fed with the variable components of the right-hand side of Expression 3—the constant components $\cos\theta$ and $\cos\phi$ being previously set in the computor—and presents the required answer $V$ on indicator 34.

The choice of the angles $\theta$ and $\phi$ depends on the speed range to be covered and the Mach number involved. For maximum sensitivity at low speeds one receiver mounted directly aft and the other forward of the source, e. g. the spark-gap 13 gives the best arrangement, i. e. $\theta=0$ degrees and $\phi=180$ degrees. However at Mach numbers greater than unity no signal will be received at the $\phi$ receiver; while in addition, this is not a practicable layout as stream turbulences created by the forward receiver and transmitter will upset the measurements. There are three main considerations governing the choice of these angles.

(1) The difference between the angles should be as great as possible so that the vector velocities may be widely separated, thereby giving a sensitive speed indication.

(2) The maximum angle must not exceed $\psi$, where $1/\sin \psi = $ Mach number.

(3) The minimum angles should be such as to keep the pressure-wave path clear of boundary layers and turbulence.

The form and manner of operation of the apparatus already outlined will now be described in greater detail and with particular reference to the voltage waveforms of Figure 3; all of these are drawn to the same horizontal time scale, which is however considerably distorted, especially as regards the time axis, to simplify the explanation; for example, the maximum values of $t_1$ and $t_2$ of waveform $(g)$ are, in practice, very much less than the value of $t$ of waveform $(b)$, while the comparison period $T_4$ to $T_5$ is always very much longer than the maximum run-down period $T_3$ to $T_4$. The level of ground potential is indicated in each case.

Figure 3:
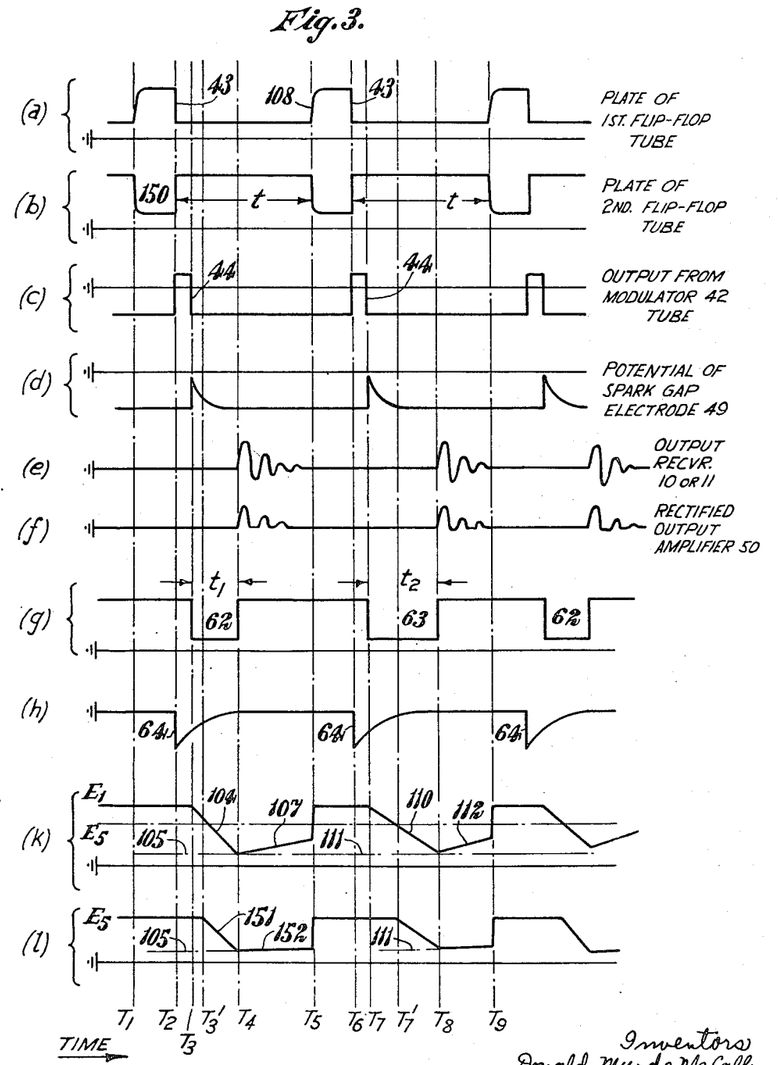
Figure 3 is a set of waveform diagrams illustrating the operation of the embodiment of Figure 2.
Figure 4:
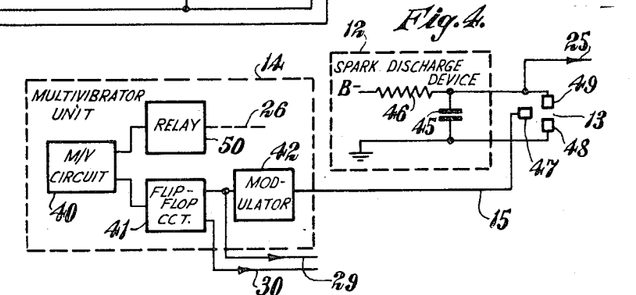
Figures 4 and 5 are fragmentary block schematic diagrams showing certain elements of Figure 2 in greater detail.

Multivibrator unit 14, see Figure 4, consists of a normal type of multivibrator circuit 40 controlling a two-tube flip-flop circuit 41. The voltage waveforms at the plates of the two flip-flop tubes are shown as $(a)$ and $(b)$ of Figure 3; they are, of course, in opposite phase. A convenient periodicity for the flip-flop circuit is 10 c./s. The time represented by the length $t$ of the longer part of each flip-flop cycle is much longer than the longest transit time which occurs in practice of any pressure wave from the spark gap 13 to either receiver 10, 11. Voltage waveform $(a)$ is applied to a modulator 42 which first develops from the trailing edges 43 of the pulses short positive-going pulses shown in waveform $(c)$. These pulses are then applied in said modulator 42 to the grid of a tube having an inductive load so as to switch it into a conductive condition and then rapidly switch it back into a non-conductive condition. High amplitude positive pulses (not shown) are thus produced at the plate of such tube in synchronism with the trailing edges 44 of the pulses of waveform $(c)$ and these constitute the means fed over lead 15 to the spark discharge device 12 for initiating the main discharge across spark-gap 13.

The energy for the main spark discharge is derived from a condenser 45 located in the spark-discharge device 12 and charged from a negative source of high-tension supply by way of a resistor 46. The voltage across the condenser is not sufficient to initiate a spark discharge across the main spark-gap 13; this discharge is initiated by a pilot spark occurring between a pilot electrode 47 and either of the main electrodes 48, 49 of the spark-gap and caused by each high positive pulse supplied as described above from modulator 42. The voltage waveform appearing on the ungrounded main electrode 49 is shown at $(d)$ Figure 3; it will be seen that the main discharge reduces the potential of electrode 49 substantially to ground potential. This voltage waveform $(d)$ is fed by connection 25 to square-wave generator 24 to initiate the generation of each pulse within the latter. A negative source of high tension supply is used rather than a positive one because it is found that a negative voltage gives a more definite triggering action by increasing the potential difference between electrodes 47 and 49.

The voltage waveform $(a)$, Figure 3, is also applied by way of lead 29, and voltage waveform $(b)$ Figure 3, by lead 30, as shown in Figure 1, to the reciprocal computor 27 for certain control purposes therein to be explained later.

The multivibrator 40 also controls a switching relay 50 which, as indicated by the dotted line 26 denoting a switching link, operates selection switching device 22 and certain switches in the reciprocal computor 27.

Figure 5:
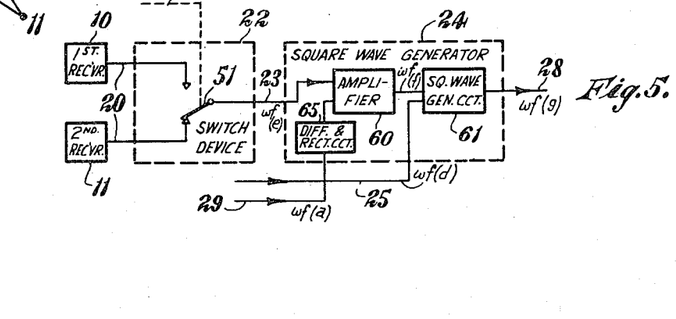

Referring now to Figure 5, the switching device 22 consists of a single-pole changeover switch the fixed contacts of which are connected respectively to leads 20 and 21 from receivers 10 and 11, and the moving contact 51 of which is connected by way of lead 23 to the square-wave generator 24. The moving contact 51 is operated by switching relay 50 as indicated by link 26.

Receivers 10 and 11 are of the piezo-electric type and the waveform of the voltage set up in either of them on receipt of a pressure-wave is shown at $(e)$ Figure 3. It will be seen from this waveform that the pressure-wave sets up a "voltage ring" at the resonant frequency of the crystal receiver, this frequency corresponding to a frequency in the frequency spectrum of the pressure-wave; it is arranged that the first half cycle of each voltage ring is positive-going.

The output from whichever of the receivers 10, 11 is connected through to lead 23 is fed first to an amplifier stage 60 forming part of the square-wave generator 24; after amplification the signal is then rectified by a suitable diode arrangement that passes only the positive half cycles and also acts as limiter to noise signals. The output from this stage, the waveform of which is shown at $(f)$ Figure 3, is applied to a pulse generating circuit 61; where it operates to terminate the generation of a pulse which has been initiated just previously by the application thereto over lead 25 of the waveform $(d)$ Figure 3, from the spark-gap 13.

Figures 6, 7, 12, 19:
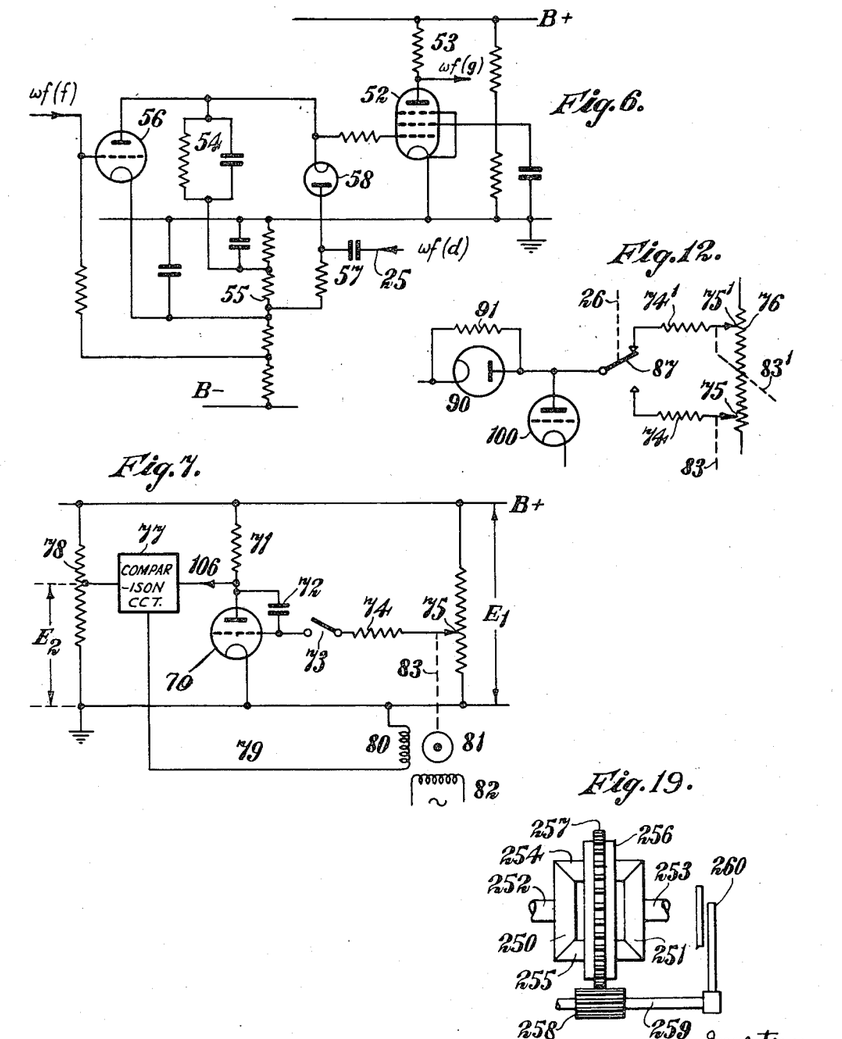
Figures 6 and 7 are simplified circuit diagrams of parts of Figure 2.
Figure 12 is a fragmentary circuit diagram showing an alternative form of part of the circuit arrangement shown in Figure 8.
Figure 19 is a diagrammatic view showing one mechanical form of final computor.

One suitable form of the pulse generating circuit 61 is shown in Figure 6 and comprises a tube 52 having a plate load resistor 53 and with its control grid connected by way of a parallel resistance/capacitance network 54 of long time-constant to a tapping upon a biasing potentiometer network 55 such that the tube 52 is normally held beyond cut-off. A second tube 56, having its plate connected also to the network 54 and to the grid of tube 52, is arranged with its cathode and control-grid so connected to the biasing network 55 that it also is normally heavily biased beyond cut-off. The waveform $(f)$ Figure 3, from the amplifier stage 60 is applied to the control-grid of tube 56 while the waveform $(d)$ Figure 3, is applied from the spark-gap 13 over lead 25 and through blocking condenser 57 and diode 58 to the control grid of tube 52, the network 54 and the plate of tube 56.

The arrival of each positive-going pulse of the waveform $(d)$ Figure 3 (coincidental with a spark occurring at the spark-gap 13), causes the condenser of the network 54 to become charged whereby the tube 52 is rendered conductive with resultant initiation of a negative-going pulse at the plate of such tube. Simultaneously the tube 56 is provided with a source of plate potential but is still not rendered conductive by reason of the amount of negative bias applied to its control grid. This condition persists, with slow discharge of the long-time constant network 54, until the arrival of the related first positive half-cycle of the voltage waveform $(f)$ Figure 3, from the amplifier 60 and derived from one or other of the receivers 10, 11. The application of this potential to the grid of tube 56 renders the latter conductive and promptly discharges the condenser of the network 54 whereby the original negative bias potential is again applied to the grid of tube 52 to cause it again to be cut-off. The plate potential of this tube immediately rises again to terminate the output pulse therefrom. At the same time tube 56 loses its plate potential supply and promptly becomes cut-off again. The circuit then awaits the arrival of the next pulse of the waveform $(d)$ Figure 3.

The resultant output from the plate of tube 52 is a series of negative-going pulses 62, 63 shown in voltage waveform $(g)$. It will be seen that each of these pulses begins synchronously with the steep leading edge of each pulse of waveform $(d)$ and ends synchronously with the leading edge of the first half cycle of the rectified signal of waveform $(f)$. Pulses 62 are accordingly of length $t_1$ as above defined, whilst the alternate pulses 63 are of length $t_2$. This train of pulses is applied to reciprocal computor 27 over lead 28. To prevent false response of square-wave generator 24 to the voltage surges produced by each discharge at spark-gap 13 the amplifier stage 60 is suppressed during each of such periods by a short negative pulse 64 of a voltage of waveform $(h)$, Figure 3, obtained by differentiating and rectifying in stage 65 the voltage waveform $(a)$, Figure 3, derived from the flip-flop circuit 41 over lead 29. It will be seen that each pulse 64 begins (at time $T_2$) sufficiently in advance of the generation of a spark at time $T_3$. These suppressor pulses are made to last for sufficient time after each spark discharge by a suitable choice of the time constant of the rectifying circuit of stage 65.

The operation of the reciprocal computor 27 will now be described and can best be understood by considering first the simplified circuit of Figure 7. In this computor a so-called Miller tube 70 (which is shown for convenience as a triode but is usually a pentode) has its plate connected by way of a load resistance 71 to the positive pole B+ of a high tension supply source of voltage $E_1$ the negative pole of which is grounded. The control grid of the tube is connected to the plate by way of a feedback condenser 72 and by way of an on/off switching arrangement, indicated diagrammatically at 73, and a resistance 74 to a slider 75 on a potentiometer 76 connected across the said high-tension supply source. The plate of the tube 70 is also connected by way of a comparison circuit 77 to a fixed tapping at a voltage $E_2$ above ground on a second potentiometer 78 also connected across the said high-tension supply source. An A. C. output connection 79 from said comparison circuit 77 is lead to ground by way of one field winding 80 of a two-phase induction motor 81 the other field winding 82 of which is connected to some convenient source of A. C. voltage of constant amplitude, of the same frequency as, and having a 90 degree phase shift with respect to the A. C. applied by connection 79. The rotor of motor 81 is arranged to adjust the position of the slider 75 by some convenient linkage indicated diagrammatically by the dotted line 83. It is assumed, for the moment, that, by some means not shown, switch 73 may be closed for the exact duration of each negative-going pulse of one series only of the two series included in the voltage waveform (g), Figure 3. It is also assumed that, by means again not shown, the Miller tube 70 is negatively biased to be non-conductive just prior to the commencement of a pulse and that this bias is removed when the pulse commences. The plate voltage of the tube 70 thus has the value $E_1$ before the pulse arrives.

In operation, the leading edge of the applied pulse closes switch 73; the tube 70 accordingly begins to take current and its plate voltage therefore begins to "run down" linearly in the known Miller-valve fashion at a rate of $$\frac{E}{RC}$$

volts per second approximately, where E is the control voltage of slider 75 and R and C are respectively the values of resistance 74 and condenser 72. As R and C are constant, the speed of the run-down depends directly on the value of the control voltage E and hence on the position of slider 75. The run-down always starts at the same starting voltage—namely the voltage $E_1$; if it could be arranged that the setting of slider 75 is always so adjusted that the terminating voltage at which the run-down ends always has a predetermined value $E_2$ it will be seen that the voltage traversed during the run-down will always be the same, i. e. $(E_1-E_2)$. Hence $$\frac{E_3}{RC}t_1 = \frac{E_4}{RC}t_2 = (E_1-E_2) = \text{constant} = k, \text{ say} \quad (6)$$

where $E_3$ and $E_4$ are the values of E corresponding to this adjustment of the slider in respect of the third and fourth quantities respectively and $t_1$ and $t_2$ are as previously defined.

Substituting $d_1/V_1$ and $d_2/V_2$ for $t_1$ and $t_2$ (from Equations 4 and 5) in Equation 6 one obtains:

$$\frac{E_3}{V_1} \cdot \frac{d_1}{RC} = \frac{E_4}{V_2} \cdot \frac{d_2}{RC} = k \quad (7)$$

As $d_1=d_2=$constant, and as R and C are constants also, $E_3$ and $E_4$ are clearly proportional directly to $V_1$ and $V_2$ respectively, the constants of proportionality and hence the scales of $V_1$ and $V_2$ being the same in each case. So, as already stated, the third and fourth quantity outputs ($E_3$ and $E_4$) from the reciprocal computer are proportional to the reciprocals of the transit times or pulse lengths $t_1$ and $t_2$ and directly proportional to the apparent velocities $V_1$ and $V_2$ along paths 17 and 18 of Figure 1.

It will be noted that since the voltages $E_2$, $E_3$ and $E_4$ are all derived from the high tension supply voltage $E_1$ there can be no first-order errors produced by changes in $E_1$. Only relative values are of importance.

In order to adjust the control voltage E till the terminating voltage has that predetermined value $E_2$ servo means, constituted by comparison circuit 77 and two-phase motor 81 are provided, the adjustment being effected in successive intervals between the end of each pulse and the beginning of the next.

The operation of the servo means is broadly as follows. At the end of each run-down, Miller tube 70 is maintained with its plate voltage in a condition rising slowly from its terminating voltage whilst the latter voltage is compared in comparison circuit 77 with voltage $E_2$, derived from potentiometer 78. Means for so conditioning the plate voltage of the Miller tube 70 will be described later. If the two voltages are equal, no A. C. output on connection 79 results from this circuit; slider 75 is then in the correct position with its voltage proportional to the reciprocal of the length of the last negative-going pulse that had caused the closing of switch 73. If the voltages are not equal, an A. C. output depending in phase and amplitude on the sense and extent of the difference between these voltages is fed by way of connection 79 to motor 81, causing it to revolve and adjust slider 75 in a direction such as will tend to increase or decrease the speed of run-down of the Miller tube to bring the terminating voltage more nearly equal to the predetermined value $E_2$. These adjustments are affected between pulses and the slider 75 is eventually adjusted to a position where the terminating voltage has the value $E_2$ and the control voltage E has then the value of the third or fourth quantity, i. e. voltage $E_3$ or $E_4$ as the case may be; this quantity then is fed to output computor 33 in some convenient form, for instance as the slider voltage or as a shaft rotation, the latter conveniently being supplied direct from motor 81.

Figure 8:
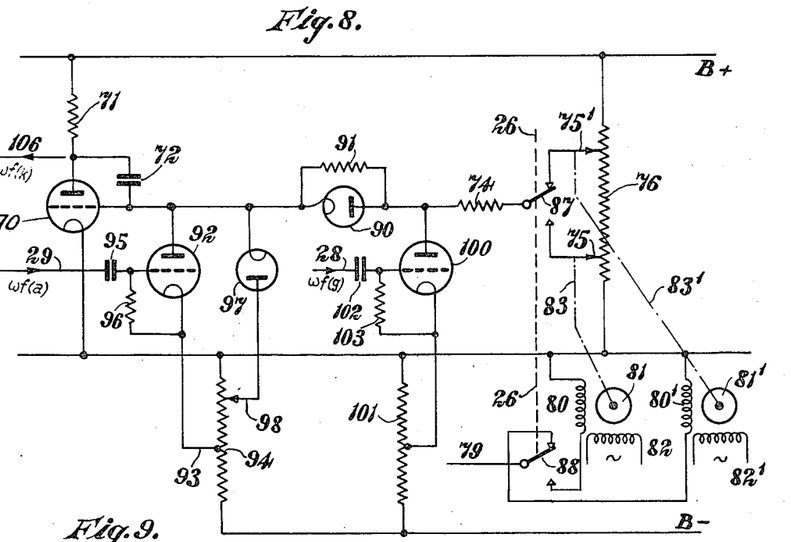
Figures 8 and 9 are circuit diagrams illustrating in greater detail the various components of the part shown in simplified form in Figure 7.

In its practical form the Miller valve circuit shown in Figure 7 appears as shown in Figure 8. One of the main modifications of this practical circuit is that the slider 75 and servo motor 81 are now duplicated in order to derive both the third and the fourth quantities simultaneously instead of only one of them. This modification is clearly shown in Figure 8, in which each additional component is given the primed reference number of the component it duplicates. As alternate pulses of the applied waveform (g) Figure 3 now have or may have different lengths arrangements have to be made to provide different alternate run-down speeds and this is done by providing the second slider 75' and so providing a second control voltage E. The second slider is controlled by the second two-phase motor 81' by linkage 83'. Changeover switch 87 is provided to connect the appropriate slider to the grid of valve 70 (by way of resistance 74 and switch 73), and changeover switch 88 is provided to connect the corresponding motor to comparison circuit 77 by way of connection 79. Both of switches 87, 88 are controlled by relay 50 (see Figure 4) over switching link 26.

In operation, during the generation of each pulse 62 of waveform (g) Figure 3, the appropriate slider—for example slider 75—and the corresponding motor, i. e. motor 81, are connected in circuit by switches 87 and 88. As will be described in greater detail later, these switches do not change over to slider 75' and motor 81' until just before the next pulse—which will be a pulse 63—is to be generated, thus allowing time for the motor 81 to adjust slider 75 in the interval between the end of the pulse 62 and the start of the next pulse 63. The third and fourth quantities are thus derived, as was the single quantity in the case of the circuit of Figure 6, in the form of the slider voltages or currents or as shaft rotations supplied from the motors 81, 81'.

Another main modification in the practical form of the Miller tube circuit of Figure 7 concerns the on/off switching arrangement 73, which in actual practice takes the form of the tube circuit shown also in Figure 8. This arrangement is as follows. The control grid of Miller tube 70 is connected to the cathode of a diode valve 90 the plate of which is connected to potentiometer 76 by way of resistance 74 and changeover switch 87, and whichever slider is in circuit at the moment, say slider 75' for instance. Diode 90 has its cathode and plate interconnected by a very high resistance 91. The plate of a tube 92 is connected to the control grid of tube 70; the cathode of such tube 92 is connected to a tapping 93 on a potentiometer 94 connected between ground and a source of negative potential B—, say of about 100 volts, whilst the control grid of tube 92 is connected to lead 29 (see Figures 2 and 4) by way of a condenser 95, and to the cathode of the tube by way of grid leak resistance 96. The control grid of tube 70 is also connected to the cathode of a diode 97 the plate of which is connected to a variable tapping 98 on potentiometer 94 much closer to ground potential than is tapping 93. The plate of diode 90 is connected to the plate of a tube 100 the cathode of which is connected to a tapping on a potentiometer 101 in parallel with potentiometer 94 between ground and the negative supply source B—. The control grid of tube 100 is connected to lead 28 (see Figures 2 and 5) by way of a condenser 102 and to the cathode of the tube by way of a grid leak resistance 103.

The operation of the above arrangement will be described with further reference to the curves of Figure 3 and, to begin with, on the assumption that resistance 91 is not connected across diode 90. From the foregoing descriptions of the operation of the apparatus of Figures 4 and 5 it will be apparent that voltage waveform (g) Figure 3, is applied to the control grid of tube 100 and voltage waveform (a) Figure 3, to the control grid of tube 92. Between the times $T_1$ and $T_2$, which delimit a positive-going pulse of the voltage waveform (a) Figure 3 developed in flip-flop circuit 41, voltages waveforms (a) and (g) both have a high positive value so that both tubes 92 and 100 are drawing current, tube 92 through diode 97 (since tapping 98 is at a much less negative potential than tapping 93) and tube 100 through resistance 74. Because of the resulting voltage drop across resistance 74 the plate of diode 90 is at a lower potential than its cathode and the diode is accordingly non-conducting so that control voltage E derived from potentiometer 76 is not applied to the grid of Miller tube 70. Owing, moreover, to the fact that diode 97 is conducting, the control grid of the Miller tube will be substantially at the negative potential of tapping 98 so that such tube is non-conducting; the plate of this tube is therefore at the full high-tension supply voltage $E_1$ as indicated in waveform (k) Figure 3. These conditions persist until the time instant $T_2$ when the edge 43, constituting the leading edge of a negative pulse of voltage waveform (a) Figure 3, arrives at the control grid of tube 92; shortly afterwards, at time instant $T_3$, the leading edge of negative pulse 62 of voltage waveform (g) Figure 3 arrives at the control grid of tube 100. The result is that both these tubes are cut off. Owing to the large time constants of the C/R circuits 95, 96 and 102, 103 by which these waveforms are applied to the tubes each of these tubes remains cut off for the whole duration of the negative pulse applied to its grid. The condition at time instant $T_3$ is therefore firstly that, as tube 100 has ceased to conduct, the current through resistance 74, and hence the voltage drop across it, has ceased, so that the potential of the plate of diode 90 has been raised sufficiently for this diode to become conducting; and secondly that, as tube 92 has also ceased to conduct and as the potential of the cathode of diode 97 has been made positive by reason of the fact that diode 90 has become conducting (the anode of diode 97 remaining at a negative potential), diode 97 ceases to conduct, thereby removing the negative bias from the grid of the Miller tube 70. The net result is that the Miller tube is now free to begin its run-down, at a speed dependent on control voltage E of slider 75'. The speed is indicated by the slope of waveform section 104 on plate voltage waveform (k), Figure 3. At time instant $T_4$ the pressure-wave arrives at the appropriate receiver 10 or 11 to end pulse 62, waveform (g), Figure 3. Tube 100 accordingly becomes conductive again and the resulting voltage drop across resistance 74 cuts off diode 90 to disconnect the grid of the Miller tube 70 from the control voltage. Tube 92, on the other hand, remains non-conducting owing to the longer time-constant of the C/R circuit 95, 96, so that a negative bias is not yet applied to the grid of the Miller tube. The "comparison" period ($T_4$ to $T_5$) now ensues, during which the terminating voltage 105 of waveform (k) Figure 3 is compared with the predetermined voltage $E_2$ in comparison circuit 77, to which the former voltage is applied by lead 106. In theory, the Miller tube 70 should remain steadily conducting during this period with its plate held constantly at the terminating voltage 105, until tube 92 becomes conductive again, to end the comparison period. In practice however it is not possible to keep the grid of the Miller tube at a sufficiently constant potential during this period, the potential having a tendency to drift negatively or positively owing to leakage across the diodes or the condenser 72. To overcome this difficulty high resistance 91 is connected across diode 90 to ensure a slight negative drift of the Miller tube grid voltage and hence a slightly rising plate voltage for such tube, as shown at 107 in waveform (k) Figure 3. This plate voltage is peak-rectified in comparison circuit 77 to produce a D. C. voltage equal to the lowest value 105 reached by the plate voltage waveform.

At the end of the comparison period $T_4$ to $T_5$, Figure 3, the apparatus is re-set preparatory to being operated by the next spark-discharge cycle. At time instant $T_5$ therefore tube 92 is rendered conductive synchronously with the end 108 of the long negative pulse of voltage waveform (a), Figure 3, the Miller tube 70 becomes accordingly biased to cut-off by tube 92 and diode 97, and the condition described as obtaining between time instants $T_1$ and $T_2$ obtains again. At time instant $T_6$ another spark-discharge cycle begins, the actual spark occurring at time instant $T_7$; this time however switch 87 connects slider 75 in circuit instead of slider 75' so a pulse 63 of the other series, and consequently of a different length, becomes applied to the reciprocal computor. The rate of run-down is therefore different, so the slope of the section 110 of wave-form (k), Figure 3, is different from that of section 104. Whether the new terminating voltage 111 is the same as the previous terminating voltage 105 depends mainly on how nearly sliders 75 and 75' are located to the positions appropriate to the correct value of the third and fourth quantities; when they are so located the terminating voltages will of course be equal since both will then be equal to the predetermined voltage $E_2$. During the comparison period $T_8$ to $T_9$ the plate voltage of tube 70 is allowed to drift slightly upwards as before and as shown at 112.

The setting of variable tapping 98 is fairly critical, since its negative potential must be large enough to ensure that the Miller tube is non-conducting between time instants $T_1$ and $T_2$ but not large enough to bring the potential of the cathode of diode 90 below that of its anode when tube 100 is conducting.

The details and operation of comparison circuit 77, Figure 7, will now be explained with reference to Figure 9.

Lead 106 from Miller tube 70 (see Figure 8) is connected to the cathode of a diode 120 the anode of which is connected to ground by way of a condenser 121 and through a resistance 122 to the control grid 123 of a pentode tube 124 which, with another pentode tube 125, is connected to operate as a balanced modulator. The plates of pentodes 124 and 125 are connected to opposite ends of a choke coil 126 the mid-point of which is connected to the positive pole B+ of the H. T. supply. Mutual induction exists between the two halves of the coil 126. Connected across this coil 126 is a condenser 127 and a resistance 128. The former serves to tune the coil to the operating frequency while the latter prevents the "Q" of the circuit from being too high and thus avoid "ringing" which might cause an oscillation to persist from one spark-discharge cycle to the next. The screen grids of the pentodes are also connected to the positive pole B+ of the H. T. supply. Both suppressor grids are connected to one end of a resistance 130 the other end of which is connected to a tapping on a potentiometer 131 connected across the H. T. supply source. Lead 30 from the flip-flop circuit of the multivibrator unit 14 (see Figures 2 and 4) is connected to these suppressor grids by way of a condenser 132 and a resistance 133. The control grid 129 of pentode 125 is connected through a resistance 134 to the $E_2$ tapping on potentiometer 78 (see Figure 7). The cathodes of the pentodes are commoned and connected by way of the parallel combination of a bias resistance 135 and large capacity condenser 136 to one end of another resistor 137 the other end of which is grounded. An A. C. voltage of 400 c./s. frequency is applied across resistance 137 by way of terminals 138. A tapping on potentiometer 78 at a voltage $E_5$ greater than $E_2$ is connected through a high value resistance 140 to the plate of diode 120. Resistance 140 has connected across it a shorting switch 141 controlled by switching relay 50 of multi-vibrator unit 14 (see Figure 4) as indicated by switching link 26; this switch is normally open but is closed momentarily during each period of operation as described below. The plate of pentode 124 is connected by way of a servo-amplifier 142 to lead 79 and thence to servo-motors 81, 81' (see Figure 8).

Both pentodes are biased to near cut-off. Owing to the 400 c./s. A. C. voltage applied across resistances 137, alternating currents of this frequency flow in the plate circuits of both pentodes 124 and 125. When the voltages on control grids 123 and 129 are equal the alternating current in one half of coil 126 balances out that in the other half so that no A. C. voltage appears on the plate of pentode 124. When the voltages on the control grids are not equal the alternating currents in the two halves of the coil are also not equal and accordingly an A. C. voltage depending in phase and magnitude on the sense and magnitude of the difference between the respective control grid potentials appears on the plate of pentode 124.

The operation of this apparatus will now be described with further reference also to the waveforms of Figure 3. During the period $T_1$ to $T_2$ both pentodes are cut off by the application to their suppressor grids by way of lead 30 of the negative pulse 150 voltage waveform (b), Figure 3, derived from the flip-flop circuit 41 (Figure 4) and maintained by time-constant circuit 132, 133. Sometime during this period switch 141 is momentarily closed and after this the control grids 123 and 129 have the voltages $E_5$ and $E_2$ respectively. At approximately time instant $T_2$ the negative pulse on the suppressor grids is removed and the bias potential on these grids attains a value equal to or slightly higher than the positive potential derived from potentiometer 131; pentodes 124 and 125 are thus rendered conductive. At time instant $T_3$ the run-down of the Miller tube begins.

The voltage on control grid 123, see waveform (l), Figure 3, however remains steadily at $E_5$ until the voltage on the Miller tube plate—see waveform (k), Figure 3—has reached the $E_5$ level (at time instant $T_3^1$), thus reducing the potential of the cathode of diode 120 to equality with that of its plate and so causing it to conduct. Condenser 121 can now discharge through diode 120, so that for the rest of the rundown the voltage on the diode plate, and hence the voltage on control grid 123, follows the Miller run-down, as shown in section 151 of waveform (l), Figure 3, till the level 105 of the terminating voltage is reached at time instant $T_4$. Immediately after the moment that the Miller tube plate voltage begins to rise (at 107, waveform (k), Figure 3) at the end of the run-down, diode 120 ceases to conduct and condenser 121 ceases to discharge, remaining substantially constant at the terminating voltage, that is at the lowest voltage (105 waveforms (k) and (l) Figure 3) reached by the Miller tube plate during the comparison period $T_4$ to $T_5$: in this way the Miller tube plate voltage is peak rectified. It will be appreciated now why it was essential to give the Miller tube plate voltage the upward drift shown at 107 waveform (k), Figure 3 (by means of resistance 91), for any downward drift would have maintained diode 120 in a conductive state and so carried the voltage of grid 123 below the terminating voltage instead of maintaining it at that voltage. During the comparison period, of course, condenser 121 tends to be charged again through resistance 140, but the time constant of the combination of this resistance and condenser 121 is arranged to be sufficiently long, compared with the comparison period, for the voltage on grid 123 to remain substantially constant at the terminating voltage 105, as shown at 152 on waveform (l), Figure 3. It is in order to reduce still further any tendency of the condenser 121 to charge appreciably during this period that resistance 140 is connected to the $E_5$ tapping on potentiometer 78 rather than direct to the positive supply terminal.

During the comparison period $T_4$ to $T_5$ therefore, control grids 129 and 123 remain steadily at the predetermined voltage $E_2$ and at the terminating voltage respectively. If, as explained above, these voltages are equal, no A. C. voltage appears on the plate of pentode 124 and the appropriate servo-motor is accordingly not operated since the appropriate slider is at the correct position on potentiometer 76. If however these voltages are not equal, the resulting A. C. voltage on the plate of pentode 124 is applied to the servo-motor (after amplification by servo-amplifier 142) in the phase necessary to cause adjustment of the slider towards the correct position.

At the end of the comparison period at time instant $T_5$, at which instant the balanced modulator is rendered non-conductive by the re-imposition of the negative pulse on the suppressor grids of pentodes 124 and 125, it is necessary to restore the voltage on grid 123 quickly to the voltage $E_5$ before the next run-down begins. This is effected by the momentary operation, shortly after time instant $T_5$ of switch 141 (by the switching-relay 50) to short-circuit resistance 140 and so allow a rapid charging of condenser 121.

It will be seen that there is a period between the time instant $T_2$ when the negative bias is removed from the suppressor grids and a time instant occurring sometime during the ensuing run-down that the pentodes are conductive with unequal voltages on their control grids. It might be expected therefore that during this period an A. C. voltage would appear on the plate of pentode 124 to cause premature operation of the appropriate servo-motor. Though this does in fact occur the period is so very short that only about one cycle of the 400 c./s. voltage could appear during it and this would produce a negligible movement of the servo-motor. Moreover, the build-up time of an oscillation in the tuned circuit formed by inductance 126 and condenser 127 is sufficiently long to ensure that during the short period concerned little or no voltage is available to operate the motor.

A similar process is repeated in the next spark-discharge cycle in respect of a pressure-wave received by the other receiver. Here the run-down of the voltage on grid 123 begins at time instant $T_7^1$, Figure 3, and ends at time instant $T_8$ with the voltage at terminating voltage level 111, see waveform (l), Figure 3. During the comparison period $T_8$ to $T_9$ the other servo-motor is operated—if this terminating voltage is not equal to voltage $E_2$—to effect the necessary adjustment on the other slider of the potentiometer 76.

The adjustment of a slider of the potentiometer 76 to the correct position is not usually effected in one comparison period. At the end of the first comparison period the slider will have usually been brought close to the correct position so that at the start of the next comparison period in that series the difference between the terminating voltage and voltage $E_2$ is substantially less than it was before. After a few such operations, however, the slider is usually near enough to the correct position for all practical purposes.

Figure 10:
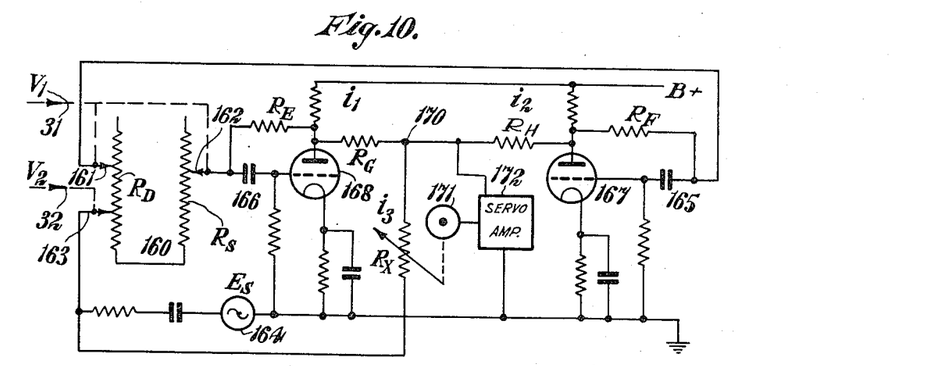
Figure 10 is a circuit diagram and Figure 11 a simplified equivalent circuit diagram showing a further part of the device.
Figures 11, 13, 17, 18:
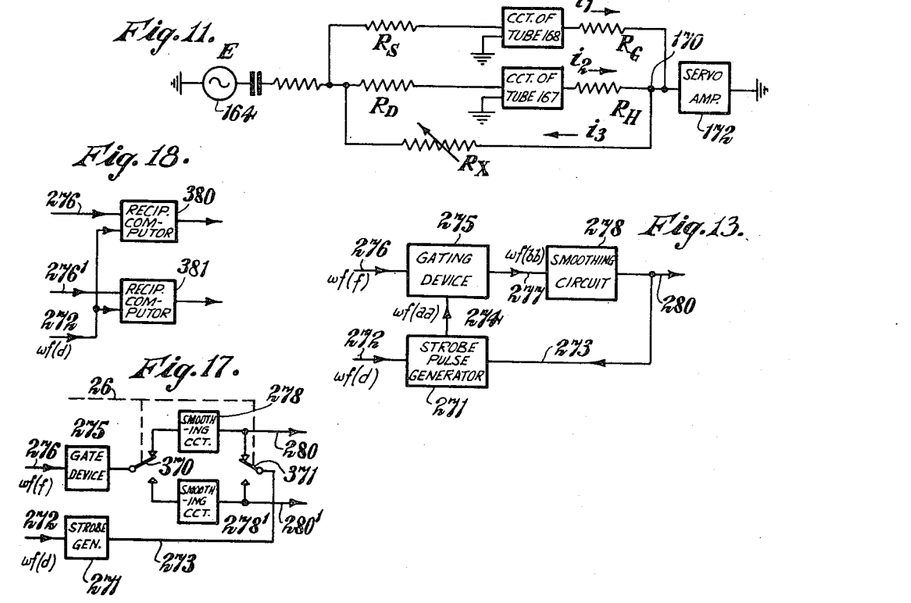

One form of the output computor 33 of Figure 2 suitable for solving the Equation 3 of $$\frac{1}{V} = \frac{\cos\theta - \cos\phi}{V_1 - V_2} + \frac{\cos\theta + \cos\phi}{V_1 + V_2}$$

is illustrated in Figures 10 and 11 and comprises a potentiometer 160 having two series connected sections with which cooperate adjustable sliders 161, 162 and 163. Sliders 161 and 162 are coupled together for conjoint movement to and from opposite free ends of the two potentiometer sections under the control of the third quantity output derived from the preceding reciprocal computor 27, for instance by slides 75 or by a shaft rotation from the associated servo-motor 81 over connection 31 while slider 163 is similarly under the control of the fourth quantity output from such reciprocal computor, for instance by slider 75' or by a shaft rotation from the associated servo-motor 81' over connection 32. These sliders are therefore operated in dependence upon the terms $V_1$ and $V_2$ respectively.

An A. C. voltage source 164 of voltage $E_s$ is connected between slider 163 and ground while sliders 161 and 162 are connected respectively through coupling condensers 165, 166 to the control-grids of tubes 167 and 168 and also to the plates of such tubes through resistances $R_F$ and $R_E$. These plates are also connected through suitable load resistances to the positive terminal B of the H.T. supply source and through resistances $R_H$ and $R_G$ to a point 170 which is connected by way of variable resistance $R_X$ back to the slider 163 and A. C. voltage source 164. This variable resistance is controlled as to its value by a servo-motor 171 energised through a servo-amplifier 172 by the A. C. potentials existing between point 170 and ground.

The A. C. voltage $E_s$, which need not be of constant amplitude, is applied to the control grids of tubes 167, 168 by way of the sum and difference resistances $R_S$, $R_D$ on the potentiometer 160, proportional respectively to $(V_1 + V_2)$ and $(V_1 - V_2)$. The tubes 167, 168 are arranged as high gain amplifiers and operate to keep sliders 161, 162 at ground potential. Hence the current $E/R_S$ flowing through $R_S$ also flows through $R_E$ and the voltage on the plate of tube 168 is $(E/R_S)R_E$ and the current $i_1$ is $(E/R_S)(R_E/R_G)$, assuming that the point 170 is at ground potential for A. C. Similarly the current $i_2$ is $(E/R_D)(R_F/R_H)$. The current $i_3$ is $E/R_X$ and, owing to the phase-reversing effect of a tube stage, this current is in opposite phase to currents $i_1$ and $i_2$. Consequently $i_1+i_2+i_3=0$ as may be seen from the equivalent circuit diagram of Fig. 11. In other words $i_3=i_1+i_2$ numerically.

When the point 170 is not at ground potential for A. C., the A. C. potential between this point and ground operates servo-motor 171 through the amplifier 172 to adjust Rx until equality is obtained. The condition then is:

$$i_3=i_1+i_2 \therefore \frac{E}{R_X}=\frac{E}{R_S}\cdot\frac{R_E}{R_G}+\frac{E}{R_D}\cdot\frac{R_F}{R_H} \therefore \frac{I}{R_X}=\frac{K_1}{R_S}+\frac{K_2}{R_D}$$

(8)

When $K_1$ is made proportional to $(\cos\theta+\cos\phi)$ and $K_2$ $(\cos\theta-\cos\phi)$ by suitable choice of the resistances $R_E$, $R_G$, and $R_F$, $R_H$, Rx becomes proportional to V and hence represents the required velocity of the moving body with respect to the surrounding medium. This resistance value Rx need not itself be determined as it is only the equivalent velocity V which is required to be indicated; such indication may be derived by pointer or other means mechanically coupled to the control of the variable resistor Rx or to the servo-motor 171.

If the fixed distances $d_1$ and $d_2$ of separation of the receivers 10, 11 from the spark gap 13 are not equal, the above-described arrangement may be modified in a simple manner to bring the output quantities to the same scale. This can be done as shown in Figure 12 by substituting for the resistance 74 of Figure 8, two resistances 74, 74' of appropriately different values $R_1$ and $R_2$ such that $$\frac{d_1}{R_1C}=\frac{d_2}{R_2C}$$

(from Equation 7). These resistances are included in the leads from switch 87 to sliders 75, 75' respectively. As these resistances are very large it may alternatively be preferable to reduce the sizes of the duplicated resistances by transferring to the position occupied by resistance 74 in Fig. 8 a large common resistance of value somewhat less than the lesser of $R_1$ and $R_2$, leaving between the fixed contacts of switch 87 and the slider resistances of comparatively small values such that when added severally to the common resistance the values $R_1$ and $R_2$ are produced respectively. These small duplicated resistances may be made variable to facilitate adjustments. The other components and the operation of the circuit remain as before.

The running frequency of the multivibrator circuit 40 should be such that the apparent velocities $V_1$ and $V_2$ are measured sufficiently frequently to produce reasonably steady outputs from the reciprocal computor 27.

The pulses of each series need not be intercalated alternatively as described above; several pulses of one series may follow each other consecutively and then several pulses of the other series. The way in which the two series are intercalated is, of course, controlled by switching relay 50 of multivibrator unit 14 (see Figure 4).

The receivers 10, 11 may alternatively be mounted on the same side of straight line 16 (see Figure 1) instead of one on each side of it. The receivers may, for speeds lower than that of the pressure wave in the medium when stationary, be located in front of the spark gap 13 with respect to the direction of the motion of the moving body, instead of behind as described; this however has the effect of lengthening the transit times of the pressure waves—and hence the lengths of the generated pulses fed to the reciprocal computor 27—in proportion to the velocity of the body, with the result that at high airspeeds, for instance, the pulses would be inconveniently long.

Figure 20:
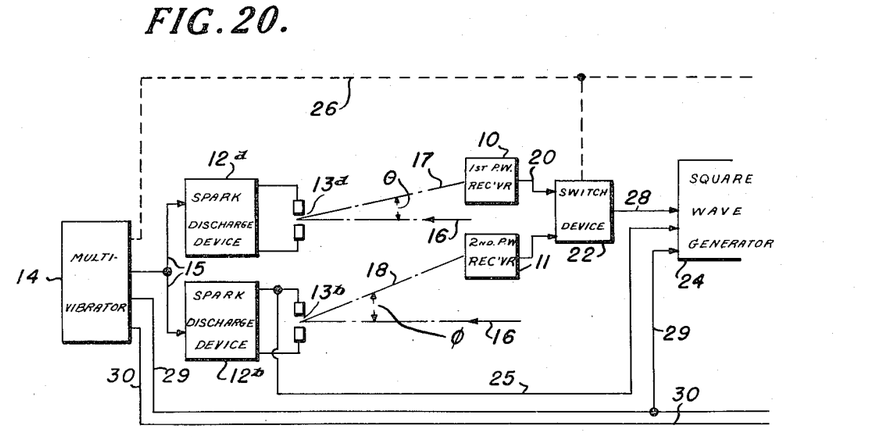
Figures 20 and 21 illustrate further modifications.

In another modification the two receivers 10, 11 may co-operate with separate sources of pressure waves instead of a common source. This form of modification is illustrated schematically in Fig. 20 which is a fragmentary redrawing of part of Fig. 1 showing the necessary changes in the latter. In this embodiment two separate spark discharge devices 12a, 12b are triggered simultaneously by multivibrator circuit 14 over leads 15 so as to cause simultaneous radiation of pressure waves from their respective spark-gaps 13a, 13b. The respective pressure waves are effective selectively, upon the first and second receivers 10, 11 which are connected, as in the embodiment of Fig. 1, by way of leads 20, 21 to the switching device 22 which, by control from the multivibrator 14 over switching link 26, governs their eventual connection by lead 28 to the square wave generator 24.

Figure 21:
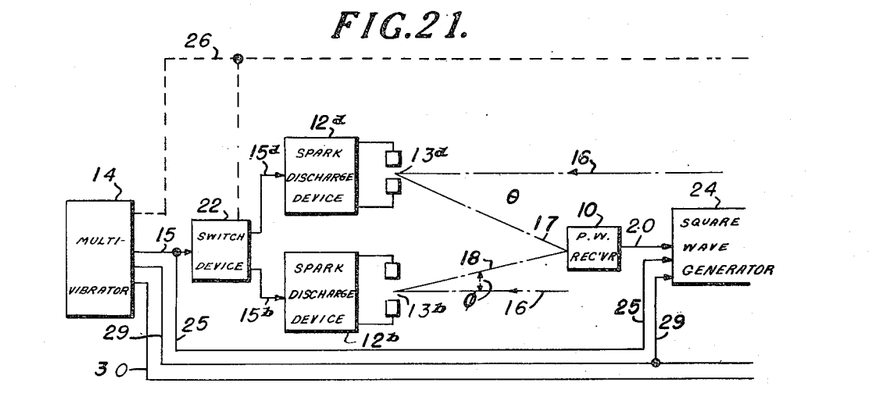

In a further modification one receiver only may be used in conjunction with two pressure-wave sources. Fig. 21 illustrates such a modification by a similar fragmentary redrawing of a part of the schematic diagram of Fig. 1. In this modification the switching device 22 is transferred to the control circuit of lead 15 between the multivibrator circuit 14 and the separate spark-discharge devices 12a, 12b whereby either one or the other but not both is triggered by way of their respective control leads 15a, 15b. The respective pressure waves over paths 17, 18 at angles $\theta$ and $\phi$ to the direction of movement 16, are operative upon a single pressure wave receiver 10 which is connected directly by way of lead 20 to the square wave generator 24. The latter is controlled, as in the embodiment of Fig. 1 by way of leads 29 and 25, the latter lead being connected, in this instance, to some point of the control circuit 15 before it is switched by the switching device 22. A convenient position for the switching device 22 is, referring to Fig. 4, between the modulator 42 and the pilot electrodes of the two spark gaps.

An error will be introduced into the velocity reading if the axis of the transmitter/receiver combination which is assumed to be adjusted to coincide with the longitudinal axis of the moving body e. g. an aircraft does not coincide with the direction of movement or line of flight. This can happen owing to sideslip of the aircraft or a change of attitude due to the lift being controlled by altering the angle of incidence of the wing. In the case of the one transmitter and two receivers both of which are assumed to lie in the same plane the error due to this cause will be least when the plane of the receivers includes the axis about which the deviation occurs. Thus if the main source of error is change of attitude about the lateral axis the receiver plane should be horizontal. The error may however be considerably reduced by using two similar sets of receivers spaced on opposite sides of the longitudinal axis of the body. The velocity along the path at the angle $\theta$ to the longitudinal axis is then taken as the mean of the velocities along the paths at $\theta$ and $-\theta$ degrees to this axis and along the $\phi$ degrees path at $\phi$ and $-\phi$ degrees. This reduces such errors to a low value in all practical uses.

If Equation 1 is solved for $V_1$ we get:

$$V_1 = V\cos\theta \pm \sqrt{V^2\cos^2\theta(V_S^2-V^2)} \qquad (9)$$

From this it will be seen that one of the two solutions will always be negative unless the square-root quantity is less than $V\cos\theta$; this is the case only when V exceeds Vs, which is when the body is moving faster than the speed of the pressure waves in the surrounding medium, i. e. in the case of aircraft, when the craft is travelling faster than sound. Each pressure wave is then received at the receiver twice over, once in the above-described way as the receiver advances towards the wave front and secondly when the aircraft overtakes that part of the wave front radiated in the direction of the aircraft's own motion. Reception of this second pulse may be suppressed if it interferes with the operation of the instrument.

Figures 13 to 16 illustrate a modified form of reciprocal convertor 27 of somewhat simplified character and which may be employed in any of the various embodiments of velocity measuring apparatus already described.

In this reciprocal computor is developed a D. C. voltage inversely proportional to the average time interval between each initiating pulse and the next subsequent terminating pulse of a sequence of initiating and terminating pulses. Referring first to Fig. 13 the device consists of a generator 271 of strobe pulses one of which is initiated by each initiating pulse applied thereto over lead 272. Generator 271 is so designed that the duration or length of the strobe pulses it generates depends inversely on the value of a positive D. C. control voltage applied thereto over lead 273. The derivation of this voltage is described later. These strobe pulses are applied over lead 274 to operate a gating device 275 so as to permit the passage through such device from lead 276 to lead 277 of the terminating pulses during only the occurrence of a strobe pulse; in other words the "gate" is "open" to each terminating pulse during the existence of each strobe pulse. Such terminating pulses or portions thereof as are passed by the gating device 275 are applied over lead 277 to a smoothing circuit 278 in which is derived the positive D. C. control voltage referred to above, in dependence on the average length of the pulses so passed to it. In addition to applying this voltage over lead 273 to control the lengths of the strobe pulses generated in generator 271 it is also applied over lead 280 to suitable utilization equipment, for instance the further computor 33 of the previous embodiments.

Figure 14:
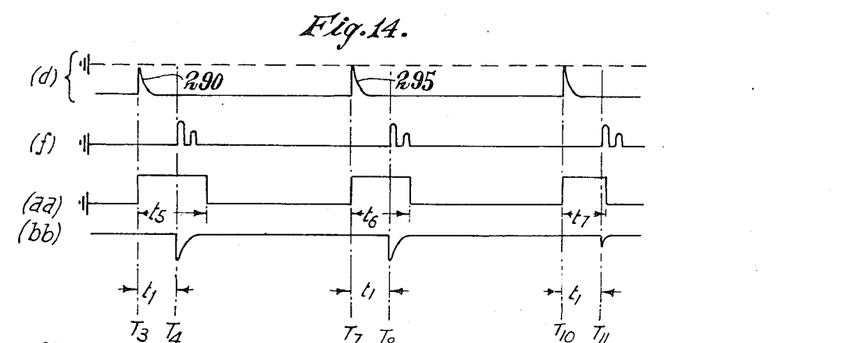
Figure 14 is a set of waveform diagrams illustrating the operation of the arrangement of Figure 17.

The operation of this apparatus will now be described with reference to the voltage waveforms of Figure 14, in which the time-scale has been distorted for clarity. Waveform (d) represents the initiating pulses applied to strobe pulse generator 271 over lead 272 and waveform (f) represents the terminating pulses applied to gating device 275 over lead 276. These waveforms correspond with those similarly depicted in Figure 3 and indicate respectively the transmission of pressure waves from a source at time instants $T_3$, $T_7$ and $T_{10}$, and the corresponding reactions of a receiver to these pressure waves at time instants $T_4$, $T_8$, $T_{11}$. Waveform (aa) represents the strobe pulses generated by generator 271 and applied to gating device 275 over lead 274, whilst waveform (bb) represents the pulses passed by the gating device to smoothing circuit 278 over lead 277. It is assumed that at the start of the sequence of operations now to be described, the D. C. voltage developed in smoothing circuit 278 is below the value appropriate to the time interval $t_1$ between each initiating pulse and the next subsequent terminating pulse, and accordingly the duration or length $t_5$ of the strobe pulses is too long.

At time instant $T_3$ then, initiating pulse 290 of waveform (d) arrives at the generator 271 and initiates strobe pulse 291 of length $t_5$ shown in waveform (aa).

At time instant $T_4$, after an interval $t_1$ from the time instant $T_3$, terminating pulse 292, waveform (f) arrives at the gating device 275 and as the gate is open, i. e. strobe pulse 291 is still in existence, the whole of pulse 292 passes through the gate in the form of pulse 293 to the smoothing circuit 278.

The effect of the large pulse 293 is to increase the D. C. voltage derived in smoothing circuit 278 with the result that the next strobe pulse to be generated will have a shorter length.

At time instant $T_7$ this next strobe pulse 294, now of shorter length $t_6$, is initiated by the next initiating pulse 295.

At time instant $T_8$, again after an interval $t_1$ from time instant $T_7$, terminating pulse 296 arrives at the gating device 275. Despite the shorter length of strobe pulse 294 the gate is still open and the whole of pulse 296 passes through it to smoothing circuit 278 in the form of pulse 297. As pulse 297 has the same length as the previous pulse 293 the derived D. C. control voltage is still further increased, thereby still further shortening the next strobe pulse generated.

At time instant $T_{10}$ this next strobe pulse 300 of length $t_7$ is initiated by the next initiating pulse 301.

At time instant $T_{11}$, again after an interval $t_1$ from time $T_{10}$, terminating pulse 302 arrives at the gating device 275. Now however let it be assumed that strobe pulse 300 is so short as to close the gate almost immediately after the leading edge of pulse 302 has passed through it. The pulse 303 passed to the integrator or smoothing circuit 278 is therefore appreciably shorter than the similar preceding pulses 293 and 297. The increase in the D. C. control voltage ceases and this voltage now has a value appropriate to the length $t_7$ of the strobe pulses, which length, to a close approximation, is equal to the interval $t_1$ between each initiating pulse and the next subsequent terminating pulse.

If strobe pulse 230 had been shortened too much with the result that the gate had closed before the leading edge of pulse 232 had arrived, no pulse would be passed to the smoothing circuit. In consequence the D. C. control voltage would decrease by reason of a predetermined amount of decay and the next strobe pulse would therefore be lengthened, till the condition described in the previous paragraph was reached.

If the time interval between each initiating pulse and the next subsequent terminating pulse remains $t_1$ a state of equilibrium is attained, each subsequent sequence of operations being an exact repetition of that commencing at time instant $T_{10}$. The gating device 275 lets through a just sufficient fraction of each terminating pulse to maintain the D. C. control voltage at the value appropriate to that length of strobe pulse; the D. C. control voltage is thus set at this value.

Any change in the interval between initiating and terminating pulses results in a change in the size of the pulse passed to the smoothing circuit 278, which correspondingly changes the D. C. control voltage to shorten or lengthen the stroke pulse accordingly, till the control voltage is again set at a new value. This automatic adjustment takes place so rapidly in practice that the lengths of the strobe pulses remain approximately equal to the average time interval between each initiating pulse and the next subsequent terminating pulse and the D. C. control voltage thus remains inversely proportional to this average interval.

Figure 15:
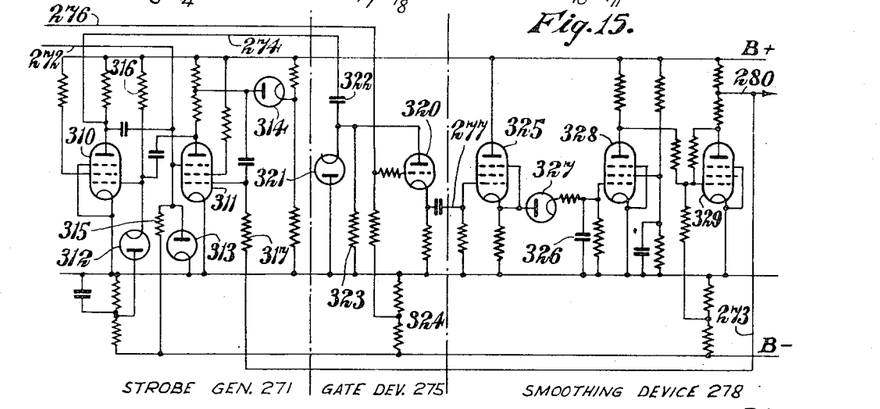
Figure 15 is a circuit diagram of one practical form of the computor of Figure 17.

Figure 15 illustrates in some detail one practical form of each of the elements 271, 275 and 278 described above.

The strobe generator 271 takes a form resembling that of the so-called "Sanatron" circuit described in the paper entitled "Ranging Circuits, Linear Time-Base Generators and Associated Circuits" in the Journal of the Institution of Electrical Engineers, vol. 93, Part IIIA No. 7, page 1191. This generator comprises cross-coupled tubes 310, 311 and associated diodes 312, 313 and 314. In the standby state the tube 311 is cut off on its suppressor grid which is connected to a negative bias source through high resistance 315 while the tube 310 is drawing plate current since its control-grid is connected through resistance 316 to the positive H. T. supply line B+.

The circuit is triggered by the positive-going pulses of waveform (d) applied over lead 272 to the suppressor grid of tube 311. The diode 313 prevents this grid from being driven positive. The action of the circuit is then similar to the more usual form of "Sanatron" circuit so that a positive-going square pulse is produced at the plate of tube 310 and the plate potential of tube 311 runs down approximately linearly in Miller-tube fashion from a value set by diode 314 to a lower valve where the tube bottoms. The rate of run-down and, consequently, the length of the positive-going square-wave at the plate of tube 310 is determined by the voltage on the lead 273 which is connected to the grid of tube 311 through resistance 317. The diode 312 connected betwen the control-grid of tube 310 and a point about −5 volts potential, prevents the control grid of tube 310 from being driven excessively negative.

The square-wave appearing at the plate of tube 310 is fed by lead 274 to the gating circuit 275 which comprises tube 320 and associated diode 321. The lead 274 is connected to the plate of tube 320 by way of condenser 322 and the aforesaid positive pulses serve as plate voltage for the tube. This tube is shunted by a D. C. restoring circuit of diode 321 and resistance 323. The tube 310 is connected as a cathode-follower and has lead 276 carrying the terminating pulses connected to its control grid. The tube is normally cut off by reason of the bias voltage applied to its grid from network 324 and the absence of plate voltage. Even during the incidence of each positive pulse over lead 274 the tube remains cut off but should a terminating pulse arrive over lead 276 while the square-wave potential is applied to the plates of tube 320 then a positive pulse is transmitted from the cathode of the tube to the smoothing circuit 278 by way of lead 277.

The smoothing or integrator circuit 278 comprises a tube 325 arranged as a cathode-follower stage supplied at its control grid with the positive pulses on lead 277 and operating to charge, by virtue of such pulses, a condenser 326 through a diode 327. The voltage on this condenser 326 represents the fluctuating control voltage used for operating the subsequent computor or other apparatus and for controlling the generator 271 but before application to these elements by way of leads 280 and 273 respectively, use is made of a pair of further tubes 328, 329 which serve to amplify and reverse the phase of the voltage fluctuations appearing on the condenser 326. The phase-reversal is, of course, necessary in order to ensure that the voltage on the lead 273 varies in the correct sense, i. e. so as to provide an increasing positive voltage on lead 273 when the condenser 326 begins to charge up due to the strobe pulses at the plate of tube 310 being too long. It will be noted that the output tapping on the plate lead resistor of tube 329 is displaced some way from the plate end. This is to ensure that the voltage on the lead 273 does not fall below a certain working level necessary for satisfactory operation of the "Sanatron" circuit.

Figure 16:
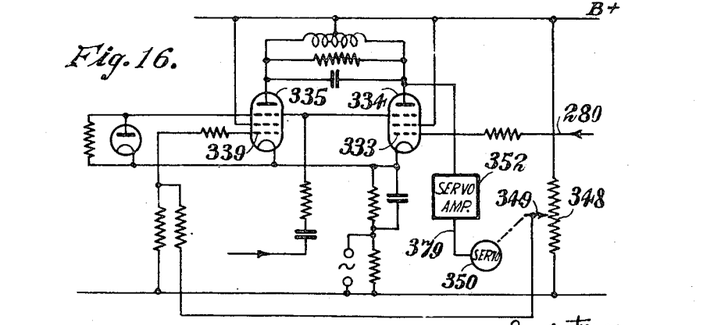
Figure 16 is a fragmentary circuit diagram showing a further modification.

When it is required to present the output from such a reciprocal computor as a shaft rotation, instead of a D. C. potential level, use may be made of a slightly revised form of the balanced modulator circuit of Figure 9. Figure 16 shows one such modified arrangement comprising tubes 334, 335 arranged in a circuit closely resembling that of tubes 124 and 125 of Figure 9. In the present modification, instead of comparing the input voltage, on lead 280, with a fixed reference voltage, this input voltage is used as a varying reference voltage and a further voltage, derived from a servo-driven potentiometer is brought into equality with it. The shaft rotation of such potentiometer thus represents the required output quantity.

Figure 9:
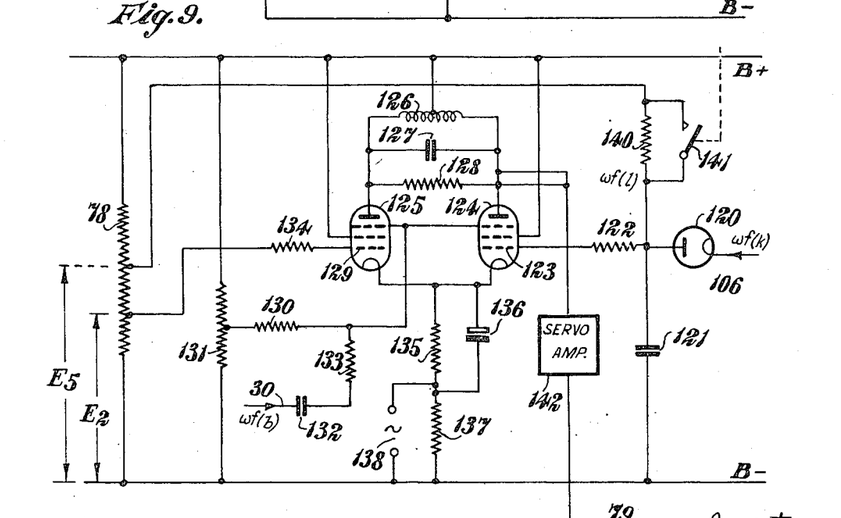

The operation of this balanced modulator circuit is fundamentally the same as regards its balancing action, as that of Figure 9. The varying voltage on lead 280 is applied to control-grid 333 of the tube 334 and the further voltage, which is to be controlled to the same value, is derived from slider tapping 349 on a potentiometer 348 and applied by way of lead 347 to the control grid 339 of tube 335. The slider 349 is moved by means of the servo-motor 350 which is supplied with power from the plate of tube 334 by way of servo-amplifier 352.

If desired the required smoothing circuit 278 may be constituted by a Miller-tube circuit of substantially conventional form and provided with means for applying an adjustable standing positive potential to its control grid to which are also applied the output pulses from the gating circuit 275 through a condenser and across a diode shunting the grid-cathode of the Miller tube.

The apparatus shown in Figure 17 is very similar to that shown in Figure 13. The smoothing circuit 278 is duplicated at 278¹ and leads 277 and 273 are connected to these two circuits by way of two changeover switches 370 and 371 as shown, these circuits being controlled by a switching link 26 which operates as described earlier. The two D. C. control voltages are applied over leads 280 and 280¹ to further computor stages. Smoothing circuit 278 is associated with the pulses of one series only, so that the D. C. voltage derived by it is inversely proportional to the average time interval between the initiating and terminating pulses of that series, whilst smoothing circuit 287¹ is similarly associated with the pulses of the other series only.

The operation of the above-described equipment need only be briefly indicated. With the switches in the position shown an initiating pulse followed by a terminating pulse of the series associated with smoothing circuit 278 are received over leads 272 and 276 as usual, the length of the strobe pulse being appropriate to the D. C. control voltage developed by circuit 278. Switches 370 and 371 are then changed over to the other position (by means of switching link 26) before the pair of pulses of the series associated with smoothing circuit 278¹ arrives. These pulses are then received over leads 272 and 276 with circuit 278¹ in operation instead of circuit 278, the length of the strobe pulse being now appropriate to the D. C. control voltage developed by this circuit. Then switches 370 and 371 are changed back to the positions shown, ready for the next pair of pulses of the first-mentioned series.

The pulses occur so rapidly that each D. C. control voltage remains substantially steady during the brief interval when the smoothing circuit concerned is disconnected from the rest of the equipment by switches 370 and 371. The Sanatron type generator 271 and the gating circuit 275, being fast acting, need not be duplicated.

It is possible to provide a double-channel system, wherein the entire reciprocal computor may be duplicated, one computor being associated with the pulses of one series only and the other with the pulses of the other series only. The arrangement may be as shown in Figure 18 where 380 and 381 are reciprocal computors, each as described above with reference to Figure 13, with output leads 280, 280¹ applying the respective D. C. control voltages to the next computor stage. In this system the initiating pulses are common to both series; each initiating pulse is, in fact, followed by two successive terminating pulses and the two time intervals concerned are that between the initiating pulse and the first terminating pulse, and that between the same initiating pulse and the second terminating pulse. These common initiating pulses are applied to both computors over lead 272. The second terminating pulses only are applied to computor 380 over lead 276, the first pulses having been removed by a gating circuit (not shown). Both first and second terminating pulses are applied to computor 381 over lead 276¹.

The operation of this modified form of equipment is as follows. Each initiating pulse simultaneously initiates a strobe pulse in each computor. Each first terminating pulse arrives over lead 276¹ only and computor 381 adjusts its gating circuit so that the gate closes almost immediately after the leading edge of this pulse has passed through it. Accordingly the output over lead 280¹ from this computor is appropriate to the average time interval between each initiating pulse and each subsequent first terminating pulse.

Each second terminating pulse also reaches computor 381 over lead 276¹ but as the computor has already responded to the immediately preceding first pulse the second pulse has no effect.

Each second terminating pulse reaches computor 380 over lead 276 and this computor operates, exactly as already described with reference to Figure 17, to derive an output voltage appropriate to the average time interval between each initiating pulse and each subsequent second terminating pulse.

The invention is not of course limited to the above described embodiments, which are given for illustrative purposes only. In particular, the invention is not only concerned with an aircraft in flight but may be applied to ascertain the velocities of other bodies with respect to other media surrounding them; it may for instance be applied to ascertain the velocity of a submerged submarine with reference to the surrounding water.

We claim:

1. Apparatus for use on a body having relative motion with respect to a surrounding medium for effecting a measurement of the relative velocity which comprises electric spark-discharge means secured on said body and within a region of said surrounding medium which has said relative movement with respect thereto, electro acoustic transducing means secured to said body and also in said moving medium, the transducing means being arranged to receive pressure wave pulses travelling thereto in two paths in the medium from the spark-discharge means, timing means connected with the spark-discharge means for effecting periodic discharge thereof to initiate pressure waves over said paths, the paths being of known predetermined length but in different mutual relationships to the direction of said relative velocity, the transducing means being arranged to provide electric current pulses in response to the arrival of the pressure wave pulses through the medium, control pulse generator means having a first input for initiating a control pulse and a second input for terminating such control pulse, electric circuit means connecting said spark-discharge means to said first input for effecting intiation of each control pulse at the instant of spark-discharge, electric circuit means for connecting the transducing means to the second input of the control pulse generator for effecting termination of each control pulse at the instant of arrival of the related pressure wave pulse at the transducing means, switching means so connected and arranged with relation to the spark-discharge and transducing means as to render the second input of the control pulse generator responsive to pulses generated in the transducer means in response to pressure waves received over first one and then the other of the respective paths in the medium, the arrangement being such that alternate control pulses derived from said control pulse generator are proportional to the transit times of said pressure wave pulses through said medium over the respective paths, reciprocal computing means including first and second members movable in proportion to the reciprocal of the time duration of an electric energy pulse applied thereto, circuit means for connecting the control pulse generator to said reciprocal computing means to apply said control pulses to the reciprocal computing means, the reciprocal computing means being connected to and controlled by said timing means so as to cause movement of said first and second members proportional respectively to the reciprocal of the time durations of a first series of alternate control pulses applied thereto and of a second series of intercalated alternate pulses applied thereto, and indicating means coupled to and operated by said first and second members of said reciprocal computing means to indicate the relative velocity existing between the body and the medium.

2. Apparatus as in claim 1 wherein the spark-discharge means includes one spark gap for initiating pressure wave pulses in the medium, and wherein the transducing means includes two spaced receiving means whereby the two paths proceed from a common transmitting point to spaced receiving points, and wherein the switching means is connected to the transducing means.

3. Apparatus as in claim 1 wherein the spark-discharge means includes two spaced discharge gaps for initiating pressure wave pulses in the medium, wherein the transducing means includes spaced receiving points, and wherein the switching means is connected to the transducing means and the spark-discharge means.

4. Apparatus as in claim 1 wherein the spark-discharge means includes two spaced spark-discharge gaps, wherein the transducing means includes a single point whereat pressure wave pulses over both paths through the medium are detected, and wherein the switching means is connected to the spark-discharge means.

5. Apparatus as in claim 1 wherein the respective paths through the medium are of equal length.

6. Apparatus as in claim 1 wherein the respective paths through the medium are of unequal length.

7. Apparatus according to claim 1 wherein said reciprocal computing means comprises an electron discharge tube arranged in a Miller type feedback circuit, means for applying said control pulses to said tube to render said circuit operative only during the times of said pulses to produce a linear "run-down" of the plate voltage of such tube, a first source of adjustable bias potential, first servomotor means including said first member for adjusting said first source, a second source of adjustable bias potential, second servomotor means including said second member for adjusting said second source, a voltage comparison circuit connected between said plate of said tube and a source of predetermined fixed potential and providing an output current dependent upon the sense and degree of inequality between said plate potential and said fixed potential and further switching means controlled by said timing means for connecting said first source of adjustable bias potential to a control electrode of said tube and said comparison circuit output current to said first servomotor means during the time periods of said first series of alternate pulses from said electric pulse generator and for connecting said second source of adjustable bias potential to said control electrode of said tube and said comparison circuit output current to said second servomotor means during the time periods of said second series of alternate pulses from said electric pulse generator.

8. Apparatus according to claim 1 wherein said indicating means comprises a potentiometer having first and second adjustable tappings coupled for conjoint movement to and from opposite ends of said potentiometer, first coupling means connecting said first and second tappings to said first member for movement thereby, a third adjustable tapping on said potentiometer intermediate said first and second tappings, second coupling means connecting said third tapping to said second member for movement thereby, first and second electron discharge tube circuits each having current feedback from plate to control grid, circuit means connecting the control grid input of said first electron discharge tube circuit to said first adjustable tapping, circuit means connecting said control grid input of said second electron discharge tube circuit to said second adjustable tapping, an alternating current source connected between the cathode points of each of said electron discharge tube circuits and said third adjustable tapping, first and second resistors connected in series between said plates of said tubes of said first and second electron discharge tube circuits, a variable resistor having a mechanically operated control member connected between the junction point of said first and second resistors and said third adjustable tapping and servomotor means having an energizing input connected between said junction point of said first and second resistors and said common cathode point of said first and second electron discharge tube circuits, said servomotor means having a movable output member coupled to said control member of said variable resistor and to a visual speed indicating member.

References Cited in the file of this patent

UNITED STATES PATENTS

| | | |
|---|---|---|
| 1,864,638 | Childwsky | June 28, 1932 |
| 1,881,543 | Hartig et al. | Oct. 11, 1932 |
| 2,151,203 | Hartig | Mar. 21, 1939 |
| 2,167,536 | Suits | July 25, 1939 |
| 2,274,262 | Wolff | Feb. 24, 1942 |
| 2,328,546 | Cafarelli | Sept. 7, 1943 |
| 2,370,692 | Shepherd | Mar. 6, 1945 |
| 2,480,646 | Grabau | Aug. 30, 1949 |
| 2,515,221 | Henning | July 18, 1950 |
| 2,530,631 | Rich | Nov. 21, 1950 |
| 2,534,712 | Gray | Dec. 19, 1950 |

FOREIGN PATENTS

| | | |
|---|---|---|
| 520,484 | Germany | Mar. 23, 1931 |
| 976,924 | France | March 1951 |